(12) United States Patent  
Phelps et al.

(10) Patent No.: US 9,247,060 B2
(45) Date of Patent: Jan. 26, 2016

(54) CALL CONTROL FOR WEB CALLS

(71) Applicant: Verizon Patent and Licensing Inc., Basking Ridge, NJ (US)

(72) Inventors: David E. Phelps, Colorado Springs, CO (US); Brian S. Badger, Divide, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 72 days.

(21) Appl. No.: 13/894,844

(22) Filed: May 15, 2013

(65) Prior Publication Data

US 2014/0341366 A1 Nov. 20, 2014

(51) Int. Cl.
*H04M 3/00* (2006.01)
*H04M 3/51* (2006.01)
*H04M 7/00* (2006.01)

(52) U.S. Cl.
CPC .......... *H04M 3/5191* (2013.01); *H04M 7/0012* (2013.01)

(58) Field of Classification Search
CPC ... H04M 3/5191; H04M 3/5183; H04M 3/51; H04M 3/5166; H04M 3/253; H04M 3/523; H04M 3/5175

USPC ......................................... 379/265.09, 265.02
See application file for complete search history.

(56) References Cited

U.S. PATENT DOCUMENTS

2014/0126715 A1* 5/2014 Lum ........................ 379/265.09

* cited by examiner

*Primary Examiner* — Rasha Al Aubaidi

(57) ABSTRACT

A system may include a contact center services system configured to receive a Web Real-Time Communication (WebRTC) call from a WebRTC caller device, and a WebRTC device configured to provide, to a customer web server, a control action application programming interface used to perform control actions for WebRTC calls in the contact center services system. The WebRTC device may be configured to receive an instruction to perform a control action for a WebRTC call from the customer web server via a WebRTC access server and forward the instruction to the contact center services system. The contact center services system may be configured to retrieve a Uniform Resource Identifier (URI) from the received instruction, identify that the WebRTC call is associated with the control action based on the retrieved URI, and execute the control action on the identified WebRTC call based on the instruction.

19 Claims, 10 Drawing Sheets

CALL CONTROL FOR WEB CALLS

BACKGROUND INFORMATION

Various technologies exist for voice communication over a network. For example, a provider of voice communication services may manage a network that enables users to communicate via voice and/or video calls. A user may participate in voice communication by using a dedicated device, such as a telephone, or by using software dedicated for voice communication, such as a Voice over Internet Protocol (VoIP) application. A common tool for accessing, processing, and navigating information on the Internet is a browser application. In order to enable voice and video communication in browser applications, an application programming interface (API), referred to as Web Real-Time Communication (WebRTC), has been developed. The provider of voice communication services may need to integrate WebRTC functionality into an existing infrastructure.

DETAILED DESCRIPTION OF PREFERRED EMBODIMENTS

Figure 1:
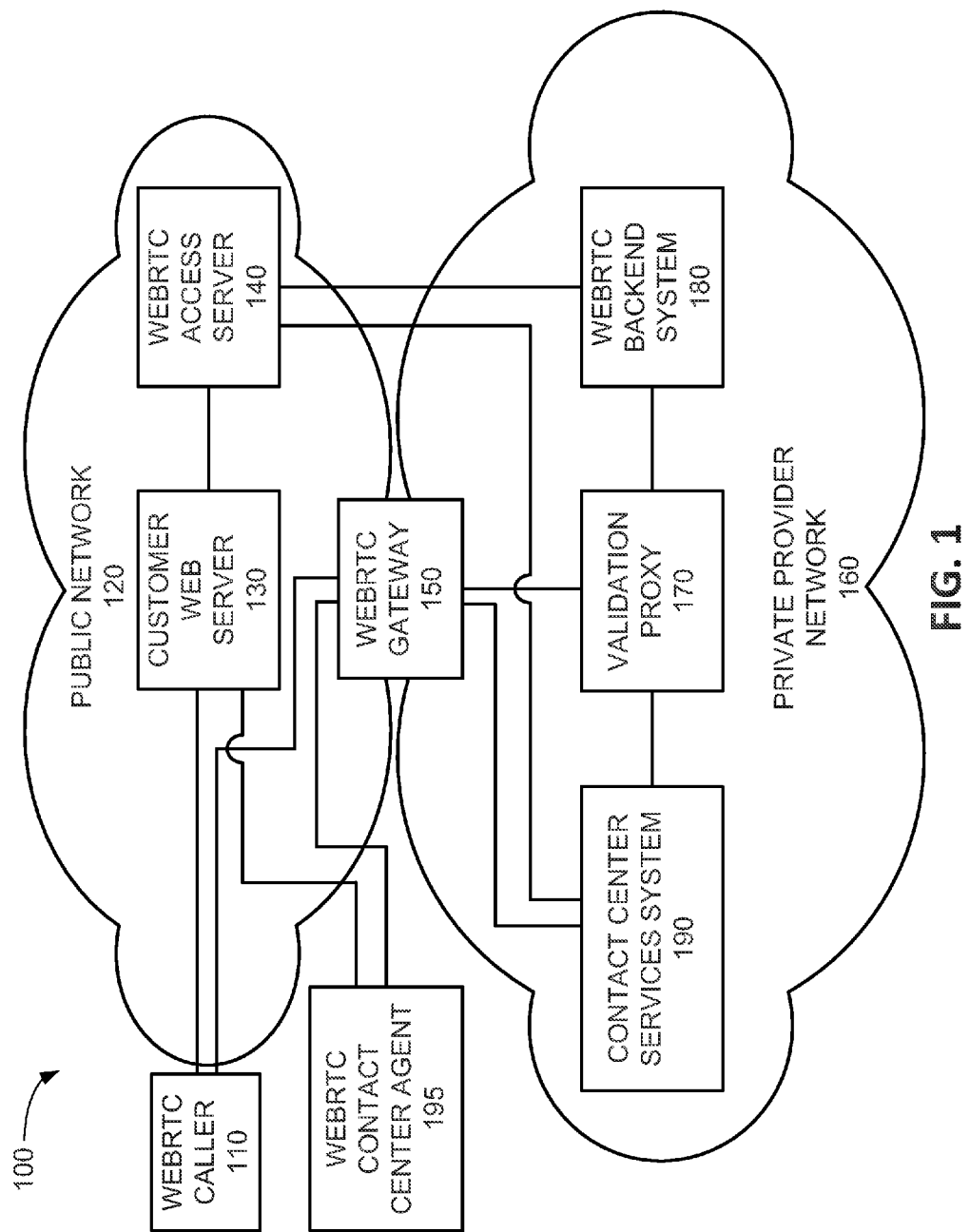
FIG. 1 is a diagram illustrating an exemplary environment according to an implementation described herein.

The following detailed description refers to the accompanying drawings. The same reference numbers in different drawings may identify the same or similar elements.

Implementations described herein relate to call control for Web calls. A Web call may be initiated by a user by using a browser application (e.g., Mozilla Firefox, Microsoft Explorer, Google Chrome, Apple Safari, etc.) configured with Web Real-Time Communication (WebRTC) capability. A WebRTC enabled browser application may include a Web Application Programming Interface (API) that interfaces with an audio and/or video application enabled for real-time communication. The browser may also interface with other applications via WebRTC API. The WebRTC API may make use of real-time communication protocols (e.g., Extensible Messaging and Presence Protocol (XMPP), Real Time Protocol (RTP), Interactive Connectivity Establishment (ICE), Session Traversal Utilities for Network Address Translation (STUN), etc.) that may manage real-time connections with other devices across a network.

A company may enable users to initiate a WebRTC call via a web page accessible to a user. For example, a user may access the company's web page and may click on a button to activate a phone call to a customer representative. In response to clicking the button, the browser application may initiate a WebRTC call to a customer representative. While the company may enable direct connection of the WebRTC call from the user's browser application to the customer representative (e.g., a communication endpoint), such a direct connection may pose a number of problems. For example, providing a direct WebRTC connection to a customer representative may leave the company's web site vulnerable to a denial-of-service (DOS) event/attack. If a large number of users click on the button within a particular time period, a network and/or phone system that handles customer service calls may be overwhelmed.

A DOS event may be prevented by using an authorization interface on a public server. For example, a caller connecting to a WebRTC gateway may be required to provide an account number and/or a password, and the WebRTC gateway may communicate with an authorization server (e.g., an OpenID server, an OAuth Server, a Diameter server, etc.) to validate the account number and password. However, a caller, such as a toll-free customer, may not have an account number and/or password and thus authorization of the caller may not be available. In such instances, authorization may need to be performed on the called party, such as the company associated with a toll-free number.

As another example, the phone system that handles customer service calls may be hosted in a private network of a telephone services provider as a contact center services system. The company may pay for use of the contact center services system and may be charged for phone calls handled by the contact center services system. For example, a user may dial a toll-free number to speak with a customer representative, may be connected to the contact center services system, and the provider may charge the company for the telephone call. In this instance, the provider may need to enable users to reach the contact center services system via WebRTC from a browser application and may need to determine how to charge the company for the telephone call. Furthermore, once a WebRTC call is connected to a contact center services system, the company may need to be able to control the WebRTC call. For example, the company may select to transfer the WebRTC call, play a particular message, and/or perform another type of control action.

Implementations described herein relate to a system that includes a contact center services system configured to receive a WebRTC call from a WebRTC caller device, assign a Uniform Resource Identifier (URI) to the received WebRTC call, and provide the assigned URI to a customer web server via a WebRTC backend system. The WebRTC backend system may be configured to provide, to the customer web server, a control action API for WebRTC calls. The customer web server may use the control actions API to send instructions to the contact center services system to perform control actions for a particular WebRTC call, using the URI assigned to the WebRTC call.

The WebRTC backend system may be configured to receive an instruction to perform a control action for a WebRTC call from the customer web server, via a WebRTC access server, and forward the instruction to the contact center services system. The contact center services system may be configured to retrieve a Uniform Resource Identifier (URI) from the received instruction, identify the WebRTC call associated with the control action based on the retrieved URI, and execute the control action on the identified WebRTC call based on the instruction. Furthermore, the contact center services system may send report actions to the customer web server using the assigned URI.

A "customer," as the term is used herein, may refer to a customer, such as a company or a corporate client, of a provider of communication services. The provider of communication services may manage a private network that hosts communication services for the customer, such as a contact center to handle calls for the customer. Implementations described herein relate to a system that prevents WebRTC denial-of-service events for the customer; enables the customer to incorporate handling of WebRTC calls into a contact center hosted in the provider's private network; enables the provider to track and bill WebRTC calls; and/or enables a customer server to pass call session data to the contact center via a WebRTC call.

FIG. 1 is a diagram of an exemplary environment 100 in which the systems and/or methods described herein may be implemented. As shown in FIG. 1, environment 100 may include a WebRTC caller 110, a public network 120, a private provider network 160, and a WebRTC contact center agent 195.

WebRTC caller 110 may include any device with a browser application configured with WebRTC functionality. For example, WebRTC caller 110 may include a portable communication device (e.g. a mobile phone, a smart phone, a tablet computer, a global positioning system (GPS) device, and/or another type of wireless device); a personal computer or workstation; a server device; a portable computer; a television, a projector, a speaker, or another type of a display or audio output device; a set-top box; a gaming system; and/or any type of device with communication capability.

Public network 120 may include one or more circuit-switched networks and/or packet-switched networks. Public network 120 may include a local area network (LAN), a wide area network (WAN), a metropolitan area network (MAN), an ad hoc network, an intranet, the Internet, a fiber optic-based network, a wireless network, and/or any combination of these or other types of networks. Public network 120 may include a customer web server 130, a WebRTC access server 140, and a WebRTC gateway 150.

Customer web server 130 may include one or more computer devices, such as server devices, which host a web site associated with the customer. For example, customer web server 130 may include a web page with a WebRTC selection object, such as a call button, to enable a user to request to talk to a contact center agent. When a WebRTC call is requested by a browser application, in response to a user of WebRTC caller 110 pressing the call button, customer web server 130 may request a Uniform Resource Identifier (URI) from WebRTC access server 140 and provide the URI to the browser application. The URI may direct the browser application to a contact center via WebRTC gateway 150. Moreover, the request may include call session data that may be used by private provider network 160 to process the WebRTC call.

Furthermore, customer web server 130 may perform control actions with respect to a WebRTC call. For example, customer web server 130 may select to a control action to play a particular message to a caller associated with the WebRTC call; a control action to park the WebRTC call; a control action to provide an estimated wait time to the caller; a control action to obtain particular information from the caller; a control action to initiate a callback; a control action to transfer the WebRTC call to a selected contact center agent; a control action to send the WebRTC call to a particular entry point in an interactive voice response flow; and/or another type of control action. The control action may be sent to a contact center services system in private provider network 160 via WebRTC access server 140.

WebRTC access server 140 may include one or more computer devices, such as server devices, which enable customer web server 130 to communicate with a WebRTC backend system. For example, WebRTC access server 140 may receive an instruction to perform a control action for a particular WebRTC call, may authenticate customer web server 130, and may forward the instruction to perform the control action to a WebRTC backend system. Furthermore, WebRTC access server 140 may receive a response to the instruction to perform the control action, and/or may receive a report message, from the WebRTC backend system, and may forward the response, and/or the report message, to customer web server 130.

WebRTC gateway 150 may include one or more network devices that function as a gateway for provider network 160 with respect to WebRTC calls. For example, WebRTC gateway 150 may route WebRTC calls from public network 120 to private provider network 160 and may route calls from private provider network 160 to public network 120. In addition, WebRTC gateway 150 may convert an incoming WebRTC call to a Session Initiation Protocol (SIP) call, or to another type of call that is used within private provider network 160. Furthermore, WebRTC gateway 150 may convert an outgoing SIP call, or another type of call used within private provider network 160, to a WebRTC call in public network 120. WebRTC gateway 150 may apply one or more filter rules to determine whether a particular WebRTC call connection should be allowed to be made into private provider network 160.

Private provider network 160 may include a circuit-switched network and/or packet-switched network. Private provider network 160 may include a local area network (LAN), a wide area network (WAN), a metropolitan area network (MAN), an ad hoc network, an intranet, a fiber optic-based network, a wireless network, and/or any combination of these or other types of networks. Private provider network 160 may include a validation proxy 170, a WebRTC backend system 180, and a contact center services system 190.

Validation proxy 170 may validate WebRTC URIs received from WebRTC gateway 150. For example, WebRTC gateway 150 may forward a WebRTC URI to validation proxy 170. Validation proxy 170 may send the WebRTC URI to WebRTC backend system 180, and receive a validation message from WebRTC backend system 180. The validation message may include call session data. Validation proxy 170 may add the call session data to the WebRTC call.

WebRTC backend system 180 may generate WebRTC URIs for WebRTC calls associated with private provider network 160 and may validate generated WebRTC URIs. WebRTC backend system 180 may interface with customer web servers 130 via WebRTC access server 140. WebRTC backend system 180 may receive a request for a WebRTC URI from customer web server 130 via WebRTC access server 140, may generate the WebRTC URI, and may forward the generated WebRTC URI to customer web server 130 via WebRTC access server 140. The generated WebRTC URI may, for example, direct a browser application running on WebRTC caller 110 to contact center services system 190. Furthermore, WebRTC backend system 180 may retrieve call session data from the received request, such as information identifying a caller, information relating to the caller, a reason for the call, etc. The retrieved call session data may be stored in connection with the generated WebRTC URI.

WebRTC backend system 180 may validate the generated WebRTC URI at a later time based on a request received from validation proxy 180. For example, WebRTC backend system 180 may determine whether the generated WebRTC URI is valid. A WebRTC URI may be valid when the WebRTC URI corresponds to a previously generated WebRTC URI and/or when the WebRTC URI satisfies one or more criteria, such as not being expired and not having been previously validated. WebRTC backend system 180 may generate a validation message in response to determining that the WebRTC URI is valid and may include any stored call session data in the validation message.

Moreover, WebRTC backend system 180 may be configured to enable communication between contact center services system 190 and customer web server 130 via WebRTC access server 140. As an example, WebRTC backend system 180 may receive an instruction to perform a control action, associated with a particular WebRTC call being processed by contact center services system 190, from customer web server 130 and may forward the instruction to perform the control action to contact center services system 190. As another example, WebRTC backend system 180 may receive a response to the instruction to perform the control action, and/or may receive a report message, from contact center services system 190 and may forward the response to the control action, and/or the report message, to customer web server 130 via WebRTC access server 140.

Contact center services system 190 may host contact center services for one or more customers of private provider network 160. For example, contact center services system 190 may include an Interactive Voice Response (IVR) platform, with or without Automatic Speech Recognition (ASR), which may request information from a caller and may direct the caller to a particular destination. Contact center services system 190 may run multiple instance of an IVR platform, with each instance being associated with a particular customer. Different customers may be associated with different types, versions, subscriptions, and/or options configured for instances of contact center services system 190.

For example, contact center services system 190 may prompt the user to make one or more selections relating to the user's reason for calling or may prompt the user to provide identifying information. Alternatively, some or all of the information may be obtained by customer web server 130 and passed to contact center services system 190 as call session data included in the WebRTC call. Contact center services system 190 may perform one or more actions after obtaining the information. For example, contact center services system 190 may park the call while a contact center agent is selected or made available, may direct the user to a voicemail system where the user can leave a message, and/or may connect the user to a contact center agent.

In some implementations, contact center services system 190 may generate a URI for an existing WebRTC call and may provide the generated URI to customer web server 130 via WebRTC backend system 180. The generated URI may be used to identify the WebRTC call and may be used to associate control actions, generated by customer web server 130, with the WebRTC call. Contact center services system 190 may receive an instruction to perform a control action from customer web server 130 via WebRTC backend system 180, may retrieve a URI from the received instruction, may identify a particular WebRTC call based on the retrieved the URI, and may perform the control action with respect to the identified WebRTC call based on the received instruction. Contact center services system 190 may send a response message back to customer web server 130, via WebRTC backend system 180, after the control action has been executed. Furthermore, contact center services system 190 may send a report message, associated with a particular WebRTC call, to customer web server 130 via WebRTC backend system 180.

Contact center services system 190 may be configured to communicate with WebRTC contact center agents 195. WebRTC contact center agent 195 may include a device with a browser application configured with WebRTC functionality. For example, WebRTC contact center agents 195 may include a portable communication device (e.g. a mobile phone, a smart phone, a tablet computer, a global positioning system (GPS) device, and/or another type of wireless device); a personal computer or workstation; a server device; a portable computer; and/or any type of device with communication capability.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

For example, while FIG. 1 shows a single WebRTC caller 110, a single customer web server 130, a single WebRTC access server 140, a single WebRTC gateway 150, a single validation proxy 170, a single WebRTC backend system 180, a single contact center services system 190, and a single WebRTC contact center agent 195 for illustrative purposes, in practice, environment 100 may include multiple WebRTC callers 110, multiple customer web servers 130, multiple WebRTC access servers 140, multiple WebRTC gateways 150, multiple validation proxies 170, multiple WebRTC backend systems 180, multiple contact center services systems 190, and/or multiple WebRTC contact center agents 195.

Figure 2:
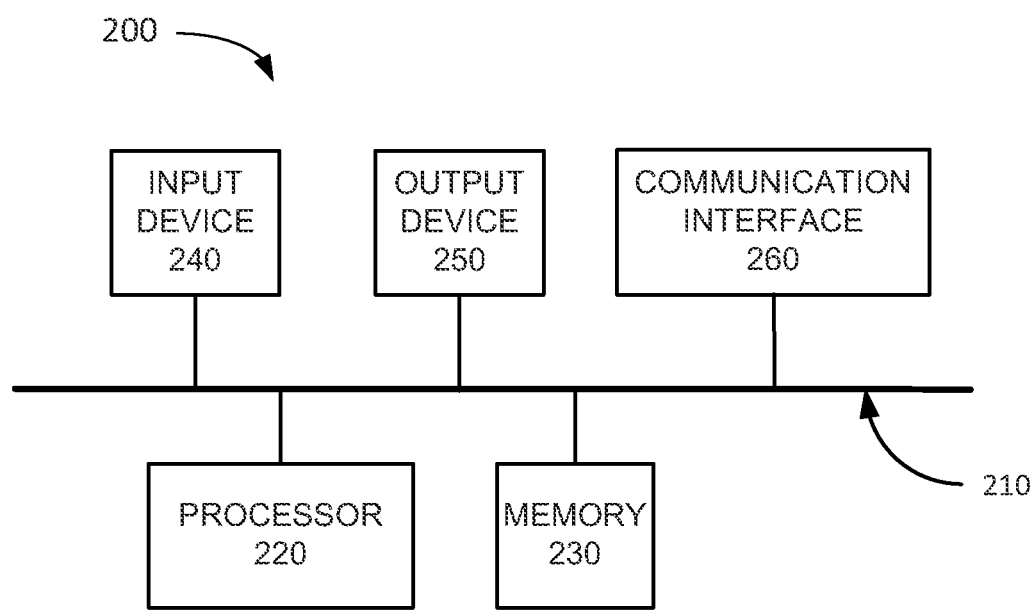
FIG. 2 is a diagram illustrating exemplary components of a device that may be included in one or more components of FIG. 1.

FIG. 2 is a diagram illustrating exemplary components of a device 200 according to an implementation described herein. WebRTC caller 110, customer web server 130, WebRTC access server 140, WebRTC gateway 150, validation proxy 170, WebRTC backend system 180, contact center services system 190, and/or WebRTC contact center agent 195 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to processing of WebRTC calls. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
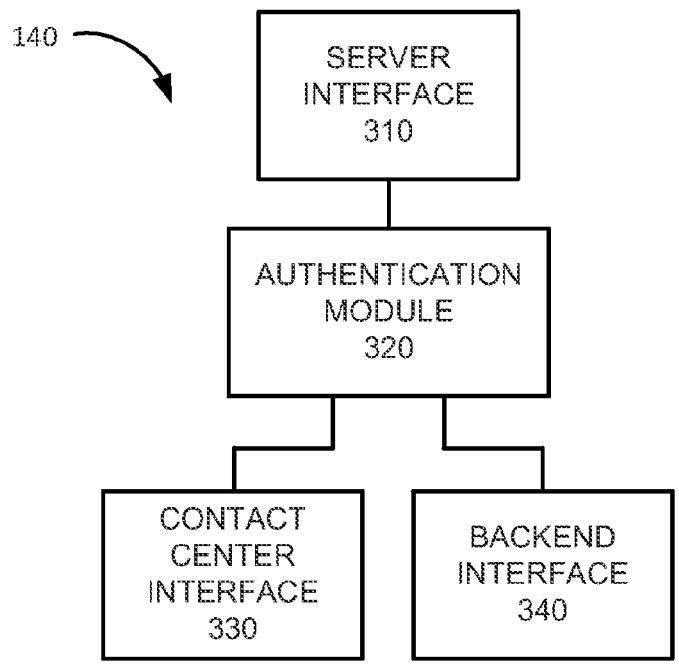
FIG. 3 is a diagram illustrating exemplary functional components of the access server of FIG. 1.

FIG. 3 is a diagram of exemplary functional components of WebRTC access server 140. The functional components of WebRTC access server 140 may be implemented, for example, via processor 220 executing instructions from memory 230. Additionally or alternatively, some or all of the functional components of WebRTC access server 140 may be hard-wired. As shown in FIG. 3, WebRTC access server 140 may include a server interface 310, an authentication module 320, a contact center interface 330, and a backend interface 340.

Server interface 310 may communicate with customer web servers 130. For example, server interface 130 may use a particular format and/or protocol for communicating with a particular customer web server 130. Furthermore, authentication module 320 may establish a connection with customer web server 130 over a secure communication channel.

Authentication module 320 may authenticate customer web server 130 when customer web server contacts WebRTC access server 140. For example, authentication module 320 may verify a digital signature associated with customer web server 130. Contact center interface 330 may communicate with contact center services system 190 and may establish a secure communication session with contact center services system 190. Backend interface 340 may communicate with WebRTC backend system 180 and may establish a secure communication channel with WebRTC backend system 180.

Although FIG. 3 shows exemplary functional components of WebRTC access server 140, in other implementations, WebRTC access server 140 may include fewer functional components, different functional components, differently arranged functional components, or additional functional components than depicted in FIG. 3. Additionally or alternatively, one or more functional components of WebRTC access server 140 may perform functions described as being performed by one or more other functional components of WebRTC access server 140.

Figure 4:
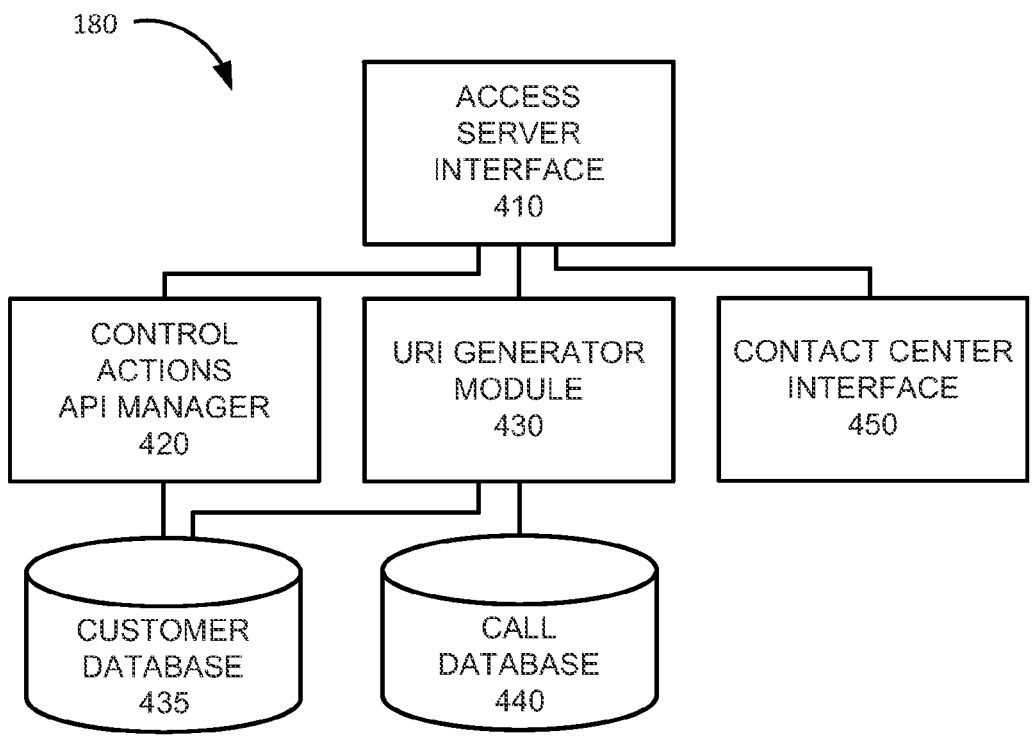
FIG. 4 is a diagram illustrating exemplary functional components of the backend system of FIG. 1.

FIG. 4 is a diagram of exemplary functional components of WebRTC backend system 180. The functional components of WebRTC backend system 180 may be implemented, for example, via processor 220 executing instructions from memory 230. Additionally or alternatively, some or all of the functional components of WebRTC backend system 180 may be hard-wired. As shown in FIG. 4, WebRTC backend system 180 may include an access server interface 410, a control actions API manager 420, a URI generator module 430, a customer database 435, a call database 440, and a contact center interface 450.

Access server interface 410 may communicate with WebRTC access server 140 over a secure communication channel. Control actions API manager 420 may manage a control action API that may be provided to customer web server 130. For example, control actions API manager 420 may keep track of what particular type and/or version of a control actions API a particular customer web server 130 has been provided with based on information stored in customer database 435. Control actions API manager 420 may update a particular control action API at a particular customer web server 130 at particular intervals.

URI generator module 430 may generate a WebRTC URI for a WebRTC call requested by customer web server 130 based on information stored in customer database 435. Customer database 435 may store information associated with particular customers. For example customer database 435 may store information identifying a particular customer (e.g., a corporate identifier (ID), etc.); may store specifications for URI generation associated with the particular customer; may store information identifying a particular contact center services system 190, or an instance running on a particular contact center services system 190, which is associated with the particular customer; may store a particular control actions API, and/or control actions API version, which is associated with the particular customer; and/or may store other types of information associated with the particular customer.

A WebRTC URI, generated by URI generation module 430, may direct WebRTC caller 110 to contact center services system 190. URI generator module 430 may generate a new call record in call database 440 and may store the generated URI in the new call record. Call database 440 may store information relating to particular WebRTC calls associated with particular customer web servers 130. For example, call database 440 may store a call ID that uniquely identifies a particular WebRTC call; a customer ID that associates a particular customer with the particular WebRTC call; call session data associated with the particular WebRTC call, such as information associated with the caller, a reason for the call, an indication that a particular action should be taken with respect to the caller, and/or other types of call session data; a URI generated for the call by URI generator 420; an indication as to whether the URI is still valid for the particular WebRTC call; and/or other types of information associated with the particular WebRTC call.

In some implementations, the WebRTC URI generated by URI generation module 420 may be used to associate control actions with a particular WebRTC call in contact center services system 190. In other implementations, contact center services system 190 may generate a URI for a WebRTC call, and may provide the generated URI to customer web server 130. The WebRTC URI may be used by customer web server 130 to associate control actions with the WebRTC call.

Contact center interface 450 may communicate with contact center services system 190 by forwarding messages from customer web server 130 to contact center services system 190 and/or by forwarding messages from contact center services system 190 to customer web server 130.

Although FIG. 4 shows exemplary functional components of WebRTC backend system 180, in other implementations, WebRTC backend system 180 may include fewer functional components, different functional components, differently arranged functional components, or additional functional components than depicted in FIG. 4. Additionally or alternatively, one or more functional components of WebRTC backend system 180 may perform functions described as being performed by one or more other functional components of WebRTC backend system 180.

Figure 5:
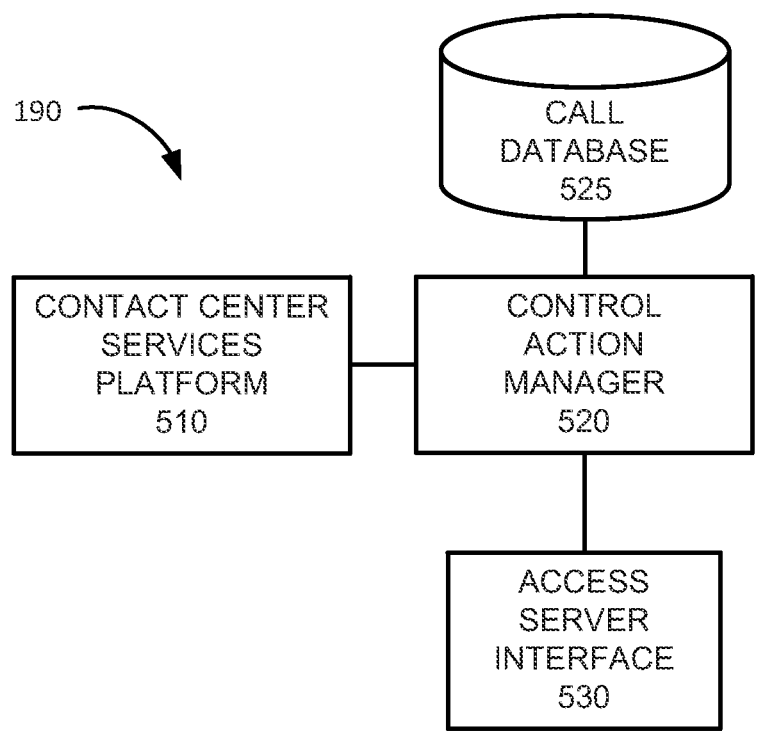
FIG. 5 is a diagram illustrating exemplary functional components of the contact center services system of FIG. 1.

FIG. 5 is a diagram of exemplary functional components of contact center services system 190. The functional components of contact center services system 190 may be implemented, for example, via processor 220 executing instructions from memory 230. Additionally or alternatively, some or all of the functional components of contact center services system 190 may be hard-wired. As shown in FIG. 5, contact center services system 190 may include a contact center services platform 510, a control action manager 520, a call database 525, and an access server interface 530.

Contact center services platform 510 may include one or more instances of a contact center services platform associated with a particular customer. For example, contact center services platform 510 may include an Interactive Voice Response (IVR) platform, with or without Automatic Speech Recognition (ASR), which may request information from a caller and may direct the caller to a particular destination.

Control action manager 520 may manage control actions for a particular WebRTC call. For example, control action manager 520 may use a URI to associate a particular control action with a particular WebRTC call being processed by contact center services system 190. In some implementations, control action manager 520 may generate a URI for a particular WebRTC call and may provide the generated URI to customer web server 130 via WebRTC backend system 180. In other implementations, control action manager 520 may receive a validation URI for a WebRTC call, from WebRTC backend system 180. The validation URI may have been generated by WebRTC backend system 180 in order to validate the WebRTC call.

Control action manager 520 may generate a call record for a WebRTC call in response to the WebRTC call being answered by contact center services platform 510 and may store the generated call record in call database 525. Call database 525 may store call records relating to particular WebRTC calls processed by contact center services platform 510. A call record may store a call ID identifying a particular WebRTC call, a customer ID identifying a particular customer associated with the particular WebRTC call, a URI associated with the particular WebRTC call, control actions that have been performed with respect to the particular WebRTC call, pending control actions that are to be performed with respect to the particular WebRTC call, report messages that have been sent for the particular WebRTC call, pending report messages that are to be sent for the particular WebRTC call, a particular point in an IVR call flow associated with the particular WebRTC call, information associated with a caller associated with the particular WebRTC call, and/or other types of information relating to the particular WebRTC call.

Control action manager 520 may receive an instruction to perform a control action from customer web server 130 via WebRTC backend system 180, may retrieve a URI from the instruction, may identify a WebRTC call associated with the retrieved URI instruction based on call records stored in call database 525, and may perform the control action with respect to the identified WebRTC call based on the received instruction. Furthermore, control action manager 520 may send a response message to customer web server 130, via WebRTC backend system 180, in response to performing the control action. Moreover, control action manager 520 may send a report message, relating to a particular WebRTC call, to customer web server 130 via WebRTC backend system 180, and may receive a response confirming that the report message has been received.

Access server interface 530 may communicate with WebRTC backend system 180. For example, access server interface 530 may forward messages from contact center services system 190 to WebRTC backend system 180 and/or may receive messages from WebRTC backend system 180 and provide the received messages to contact center services system 190.

Although FIG. 5 shows exemplary functional components of contact center services system 190, in other implementations, contact center services system 190 may include fewer functional components, different functional components, differently arranged functional components, or additional functional components than depicted in FIG. 5. Additionally or alternatively, one or more functional components of contact center services system 190 may perform functions described as being performed by one or more other functional components of contact center services system 190.

Figure 6A:
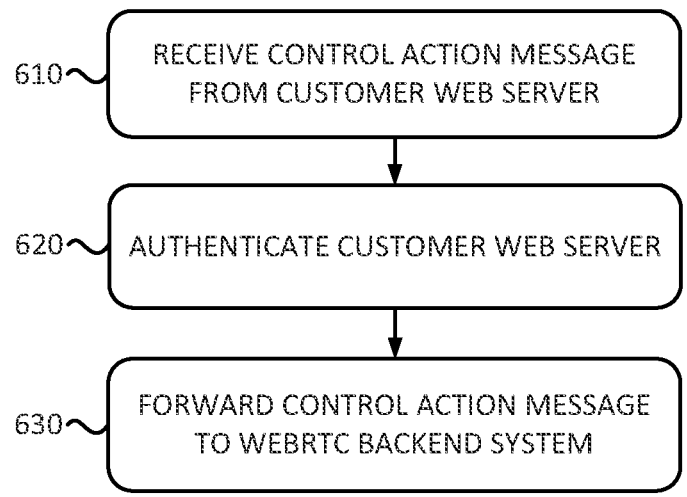
FIGS. 6A and 6B are flowcharts of an exemplary process for processing call control messages by an access server according to an implementation described herein.
Figure 6B:
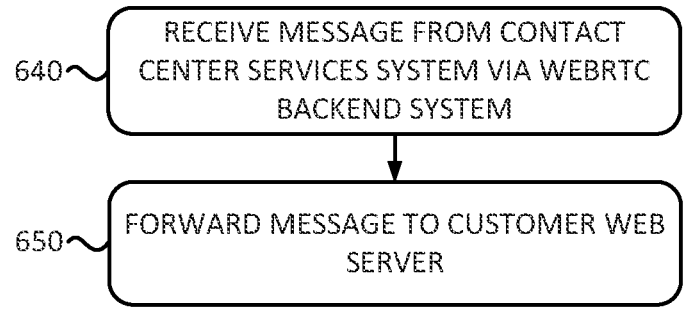

FIGS. 6A and 6B are flowcharts of an exemplary process for processing call control messages by an access server according to an implementation described herein. In some implementations, the processes of FIGS. 6A and 6B may be performed by WebRTC access server 140. In other implementations, some or all of the processes of FIGS. 6A and 6B may be performed by another device or a group of devices separate from WebRTC access server 140 and/or including WebRTC access server 140.

The process of FIG. 6A may include receiving a control action message from a customer web server (block 610), authenticating the customer web server (block 620), and forwarding the control action message to a WebRTC backend system (block 630). For example, WebRTC access server 140 may receive a control action message from customer web server 130 and may authenticate customer web server 130 by, for example, confirming that a digital signature included with the control action message, is valid for customer web server 130. If customer web server 130 is authenticated, the control action message may be forwarded to WebRTC backend system 180.

The process of FIG. 6B may include receiving a message from a WebRTC backend system (block 640) and forwarding the received message to a customer web server (block 650). As an example, WebRTC access server 140 may receive a report message from contact center services system 190, via WebRTC backend system 180, and may forward the report message to customer web server 130. As another example, WebRTC access server 140 may receive a response to a control action message from contact center services system 190, via WebRTC backend system 180, and may forward the response to the control action message to customer web server 130.

Figure 7A:
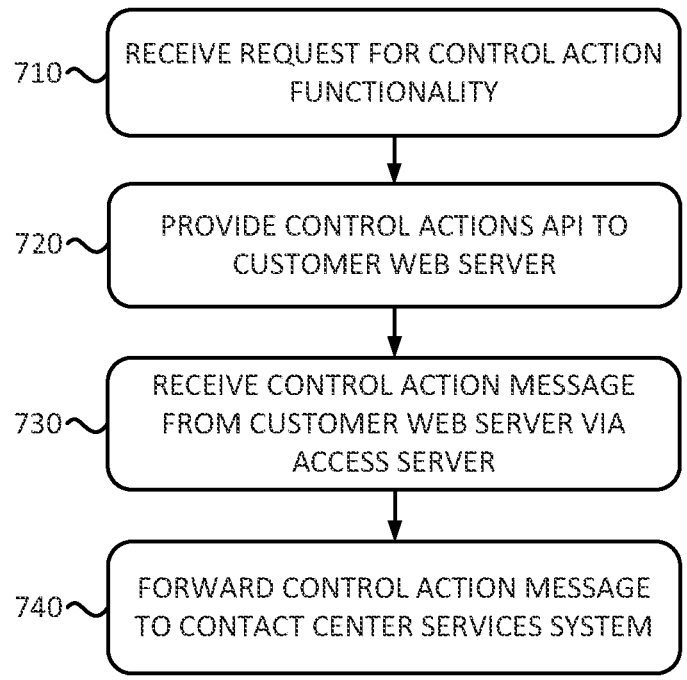
FIGS. 7A and 7B are flowcharts of an exemplary process for processing call control messages by a backend system according to an implementation described herein.
Figure 7B:
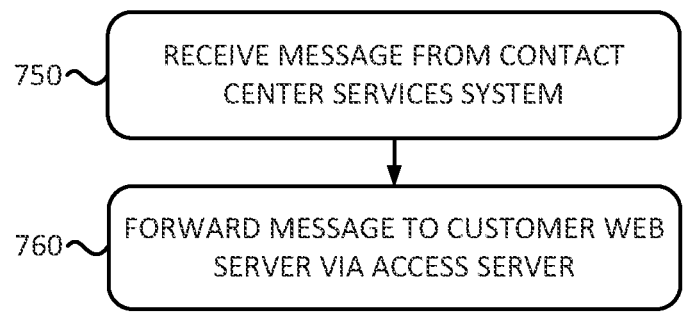

FIGS. 7A and 7B are flowcharts of an exemplary process for processing call control messages by a backend system according to an implementation described herein. In some implementations, the processes of FIGS. 7A and 7B may be performed by WebRTC backend system 180. In other implementations, some or all of the processes of FIGS. 7A and 7B may be performed by another device or a group of devices separate from WebRTC backend system 180 and/or including WebRTC backend system 180.

The process of FIG. 7A may include receiving a request for control action functionality (block 710) and providing a control actions API to a customer web server (block 720). For example, customer web server 130 may request the ability to perform control actions on a WebRTC call being processed by contact center services system 190 and control actions API manager 420 may provide a control actions API to customer web server 130 via WebRTC access server 140.

The control actions API may be installed on customer web server 130. The control actions API may enable customer web server 130 to translate particular commands into WebRTC control actions using a standardized interface. For example, the control actions API may include a set of defined commands and/or functions that may be invoked by an application running on customer web server 130. When an application running on customer web server 130 invokes a function provided by the control actions API, the function may accept as input one or more parameters and may generate a command and/or instruction, using the input of the one or more parameters. The command and/or instruction may be sent to contact center services system 190, via WebRTC backend system 180, and may be executed by contact center services system 190.

A control action message may be received from a customer web server via an access server (block 730) and the control action message may be forwarded to a contact center services system (block 740). For example, customer web server 130 may use the installed control actions API to generate an instruction to perform a control action for a particular WebRTC call and the control action API may send the instruction to perform the control action to WebRTC access server 140 and WebRTC access server may forward the instruction to perform the control action to WebRTC backend system 180. WebRTC backend system 180 may send the instruction to perform the control action to contact center services system 190.

The instruction to perform a control action may include an instruction to play a particular message to a caller associated with the WebRTC call, such as a message instructing the caller to enter information, a message informing the caller that the caller has been placed on hold, a message informing the caller that a contact center agent is being selected, etc.

The instruction to perform a control action may include an instruction to park the WebRTC call. Parking a WebRTC call may entail putting the call in a queue or pausing processing of the call while another action is being performed (e.g., a selection of a contact center agent). The instruction to perform a control action may include an instruction to inform the caller about an estimated wait time. The instruction to perform a control action may include an instruction to obtain a particular piece of information from the caller, such as by prompting the caller to enter an account number, provide a password, select a reason for the call, etc.

The instruction to perform a control action may include an instruction to initiate a callback to a caller that has been put on hold or that has been disconnected. The instruction to perform a control action may include an instruction to transfer the WebRTC call to a selected contact center agent. For example, customer web server 130 may select a type of contact center agent based on a reason for the call provided by the user, may identify an available WebRTC contact center agent 195 of the selected type, and may provide contact information (e.g., a WebRTC URI) to contact center services system 190 along with the instruction to transfer the call to the selected WebRTC contact center agent 195.

The instruction to perform a control action may include an instruction to send the WebRTC call to a particular entry point in an IVR call flow. For example, customer web server 130 may determine that the caller's reason for the call is to discuss a billing problem and may direct the call to an entry point, in the IVR flow, associated with billing problems.

The process of FIG. 7B may include receiving a message from a contact center services system (block 750) and forwarding the message to a customer web server via an access server (block 760). For example, contact center services system 190 may receive the instruction to perform the control action, may perform the control action based on the instructions, and may send a response message back to customer web server 130 via WebRTC backend system 180, informing customer web server 130 of the status of the control action (e.g., whether the control action has been successfully performed). WebRTC backend system 180 may forward the response message to customer web server 130 via WebRTC access system 140.

Figure 8A:
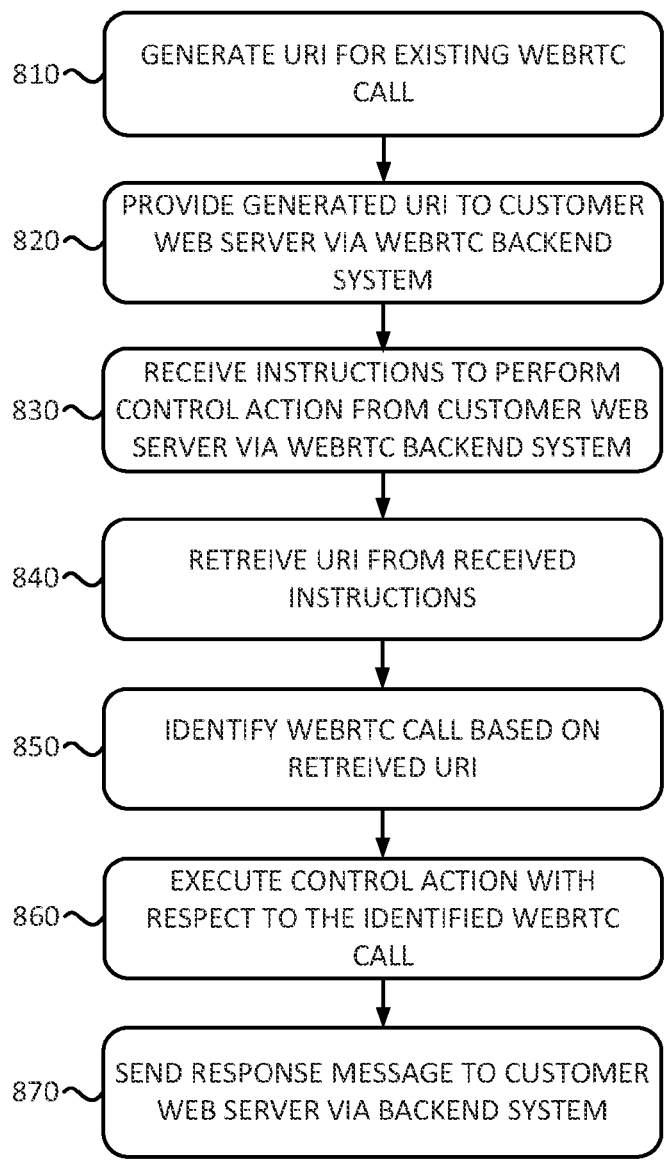
FIGS. 8A and 8B are flowcharts of an exemplary process for processing call control messages by a contact center services system according to an implementation described herein.
Figure 8B:
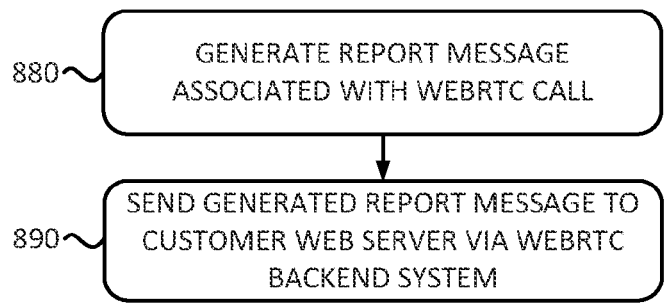

FIGS. 8A and 8B are flowcharts of an exemplary process for processing call control messages by a contact center services system according to an implementation described herein. In some implementations, the processes of FIGS. 8A and 8B may be performed by contact center services system 190. In other implementations, some or all of the processes of FIGS. 8A and 8B may be performed by another device or a group of devices separate from contact center services system 190 and/or including contact center services system 190.

The process of FIG. 8A may include generating a URI for an existing WebRTC call (block 810) and providing the generated URI to a customer web server via a WebRTC backend system (block 820). For example, control action manager 520 may generate a URI for a WebRTC call being processed by contact center services platform 510 in response to a WebRTC call being answered by contact center services platform 510. Control action manager 520 may generate a report message, may include the generated URI in the report message, and may send the report message to customer web server 130 via WebRTC backend system 180.

In other implementations, control action manager 520 may use a validation URI generated by WebRTC backend system 180 for the purpose of validating a WebRTC call via validation proxy 170. The validation URI may be provided to contact center services platform 510 with the request to answer the WebRTC call. Control action manager 520 may store a URI associated with the WebRTC call in call database 525.

Instructions to perform a control action may be received from a customer web server via a WebRTC backend system (block 830). For example, control action manager 520 may receive an instruction to perform a control action via access server interface 530.

A URI may be retrieved from the received instructions (block 840) and a WebRTC call may be identified based on the retrieved URI (block 850). For example, control action manager 520 may retrieve a URI from the received instruction to perform the control action and may use the URI to identify a particular WebRTC call based on call records stored in call database 525.

The control action may be executed with respect to the identified WebRTC call (block 860) and a response message may be sent back to the customer web server via a WebRTC backend system (block 870). For example, contact center services platform 510 may execute the control action based on the received instruction, such as playing a particular message to a caller associated with the WebRTC call; parking the WebRTC call; informing the caller about an estimated wait time; obtaining a particular piece of information from the caller; transferring the WebRTC call to a selected contact center agent; sending the WebRTC call to a particular entry point in an IVR call flow; and/or performing another type of control action. Control action manager 520 may send a response message to customer web server 130 via WebRTC backend system 180. The response message may include an indication as to whether the control action has been performed successfully. Moreover, the response message may include information obtained via the control action (e.g., information obtained from the caller).

The process of FIG. 8B may include generating a report message, associated with a WebRTC call (block 880) and sending the generated report message to a customer web server via a WebRTC backend system (block 890). For example, control action manager 520 may determine that a report message should be sent to customer web server 130. In some implementations, contact center services platform 510 may be configured by the customer to provide report messages in response to particular triggers. In other implementations, customer web server 130 may send a control message that may include instructions for when a report message should be sent to customer web server 130 with respect to a particular WebRTC call. For example, the control message may include a list of one or more trigger events for sending a report message.

As examples, a report message may include an indication that the Web Real-Time Communication call has been received by the contact center services system; an indication that a caller associated with the Web Real-Time Communication call has hung up; an indication that the caller has made a particular request; an indication that the Web Real-Time Communication call is at a particular point in an IVR flow; and/or other types of information. The report message may be sent to customer web server 130 via WebRTC backend system 180. Customer web server 130 may send a response message to contact center services platform 510, via WebRTC backend system 180, indicating that the report message has been successfully received.

Figure 9:
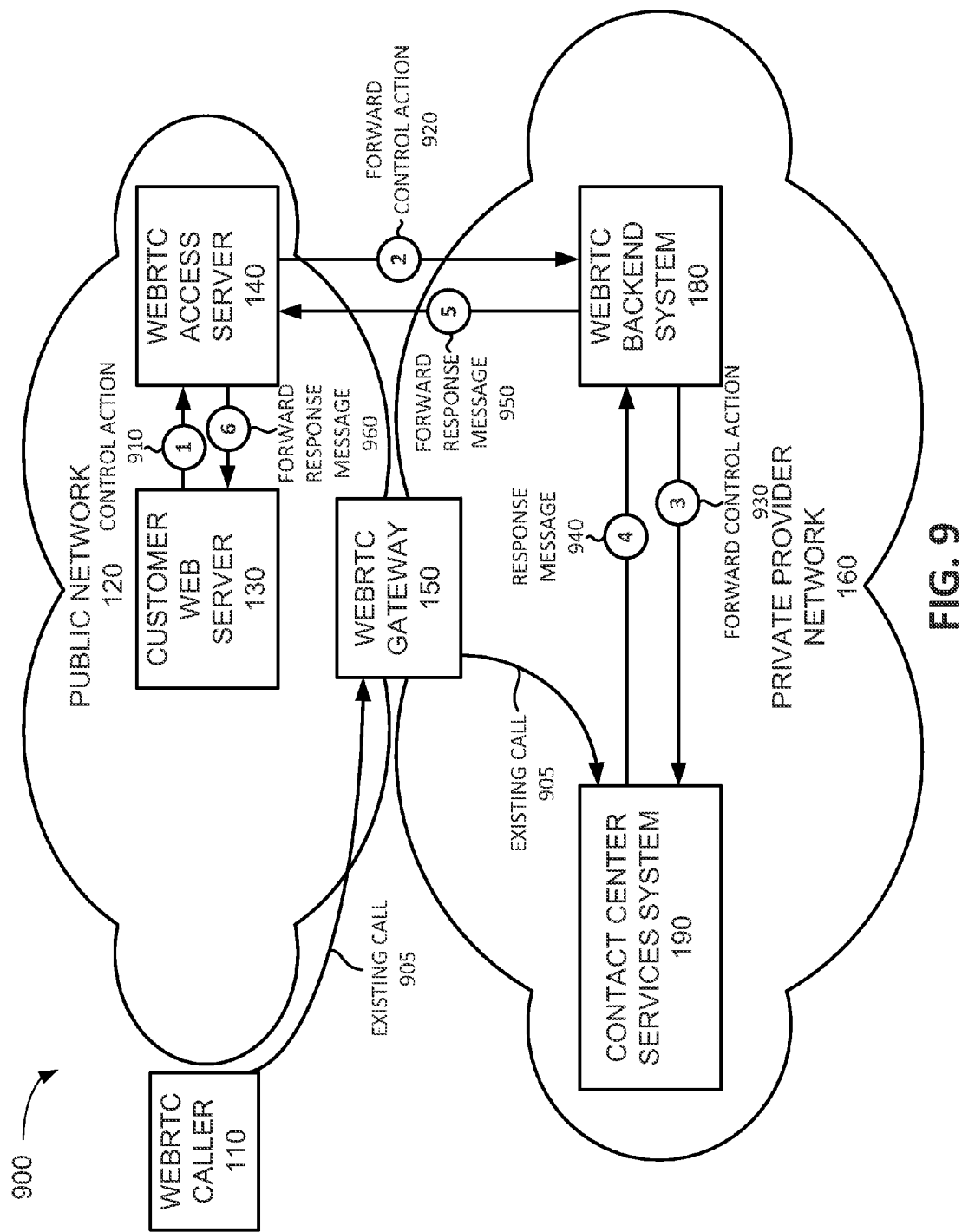
FIG. 9 is a diagram of a signal flow for processing a call control message according to an implementation described herein.

FIG. 9 is a diagram of a signal flow 900 for processing a call control message according to an implementation described herein. Signal flow 900 may begin with an existing call connection established between WebRTC caller 110 and contact center services system 190 (signal 905). For example, a caller may use a browsing application, running on WebRTC caller 110, to activate a WebRTC call by clicking on a call button while visiting a web page hosted by customer web server 130. In response, customer web server 130 may send a request to WebRTC access server 140 for a validation URI for the requested WebRTC call. WebRTC access server 140 may forward the request to WebRTC backend system 180, WebRTC backend system 180 may generate the validation URI, may provide the validation URI to WebRTC access server 140, and WebRTC access server 140 may provide the validation URI to customer web server 130. Customer web server 130 may provide the validation URI to the browser application of WebRTC caller 110 and WebRTC caller 110 may use the validation URI to request a WebRTC call connection to contact center services system 190 via WebRTC gateway 150. WebRTC gateway 150 may forward the validation URI to validation proxy 170 (not shown in FIG. 9) and validation proxy 170 may validate the validation URI with WebRTC backend system 180. If the validation URI is validated by WebRTC backend system 180, validation proxy 170 may forward the call connection to contact center services system 190 and a WebRTC call connection may be established from WebRTC caller 110 to contact center services system 190.

After the WebRTC call connection is established, customer web server 130 may select to send a control action message, with respect to the WebRTC call, to contact center services system 190. The control action message may include a URI associated with the WebRTC call. The URI may correspond to a URI generated by contact center services system 190 for the call and sent to customer web server 130 or may correspond to the validation URI generated for the call by WebRTC backend system 180.

The control action message may be sent to WebRTC access server 140 (signal 910) and, after authenticating customer web server 130, may be forwarded to WebRTC backend system 180 (signal 920). WebRTC backend system 180 may forward the control action message to contact center services system 190 (signal 930). Contact center services system 190 may execute a control action based on the control action message and may send a response message, indicating that the control action has been executed, back to WebRTC backend system 180 (signal 940). The response message may be forward to WebRTC access server 140 (signal 950) and WebRTC access server 140 may forward the response message to customer web server 130 (signal 960).

Figure 10:
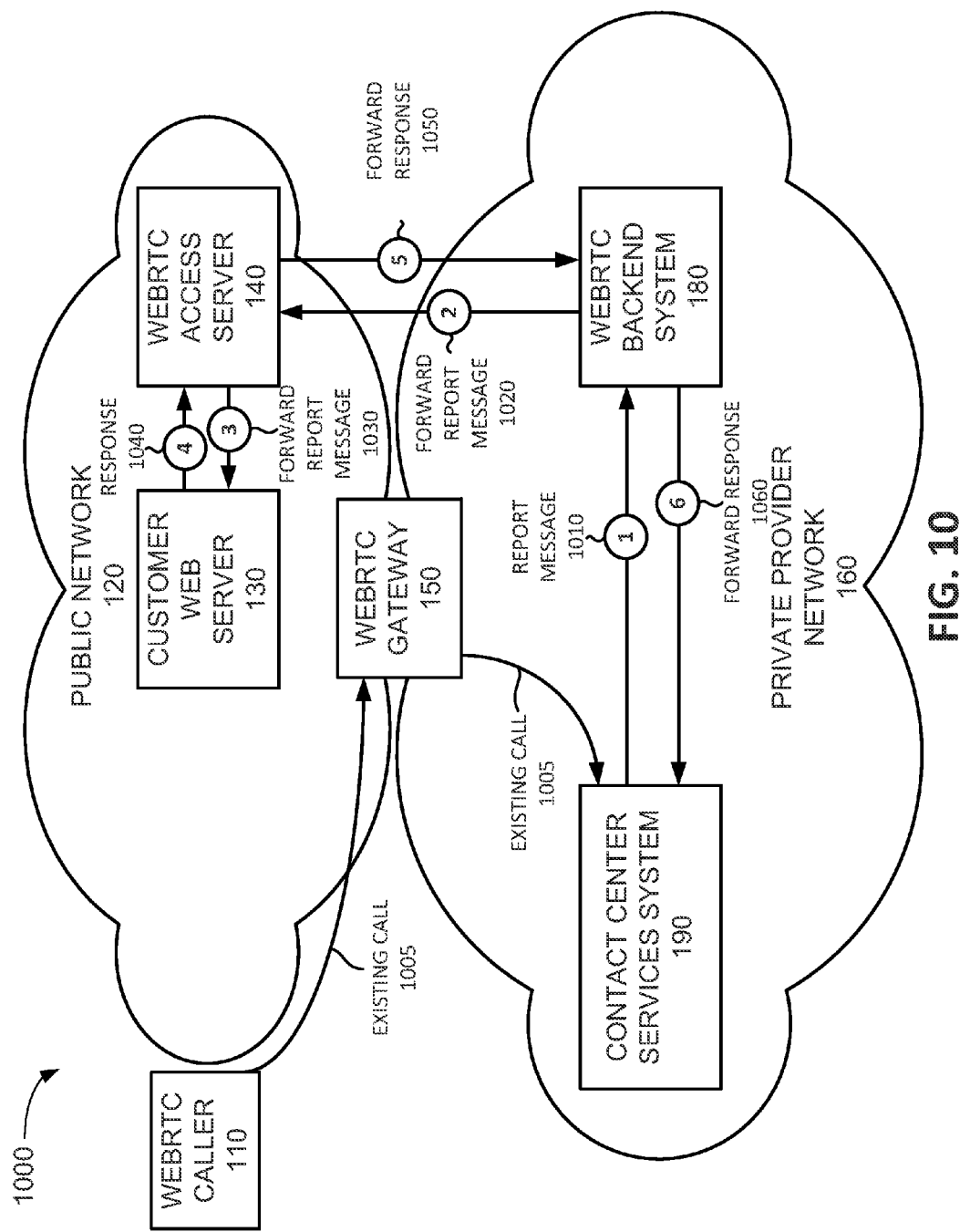
FIG. 10 is a diagram of a signal flow for processing a call report message according to an implementation described herein.

FIG. 10 is a diagram of a signal flow 1000 for processing a call report message according to an implementation described herein. Signal flow 1000 may begin with an existing call connection established between WebRTC caller 110 and contact center services system 190 (signal 1005), as explained above with reference to FIG. 9. After the WebRTC call connection is established, contact center services system 190 may select to send a report message, with respect to the WebRTC call, to customer web server 130. The report message may include a URI associated with the WebRTC call. The URI may correspond to a URI generated by contact center services system 190 for the call and sent to customer web server 130 or may correspond to the validation URI generated for the call by WebRTC backend system 180.

The report message may be sent to WebRTC backend system 180 (signal 1010) and may be forwarded to WebRTC access server 140 (signal 1020). WebRTC access server 140 may forward the report message to customer web server 130 (signal 1030). Customer web server 130 may receive the report message and may send a response message, indicating that the report message has been received, back to WebRTC access server 140 (signal 1040). The response message may be forward to WebRTC backend system 180 (signal 1050) and WebRTC backend system 180 may forward the response message to contact center services system 190 (signal 1060).

Figure 11:
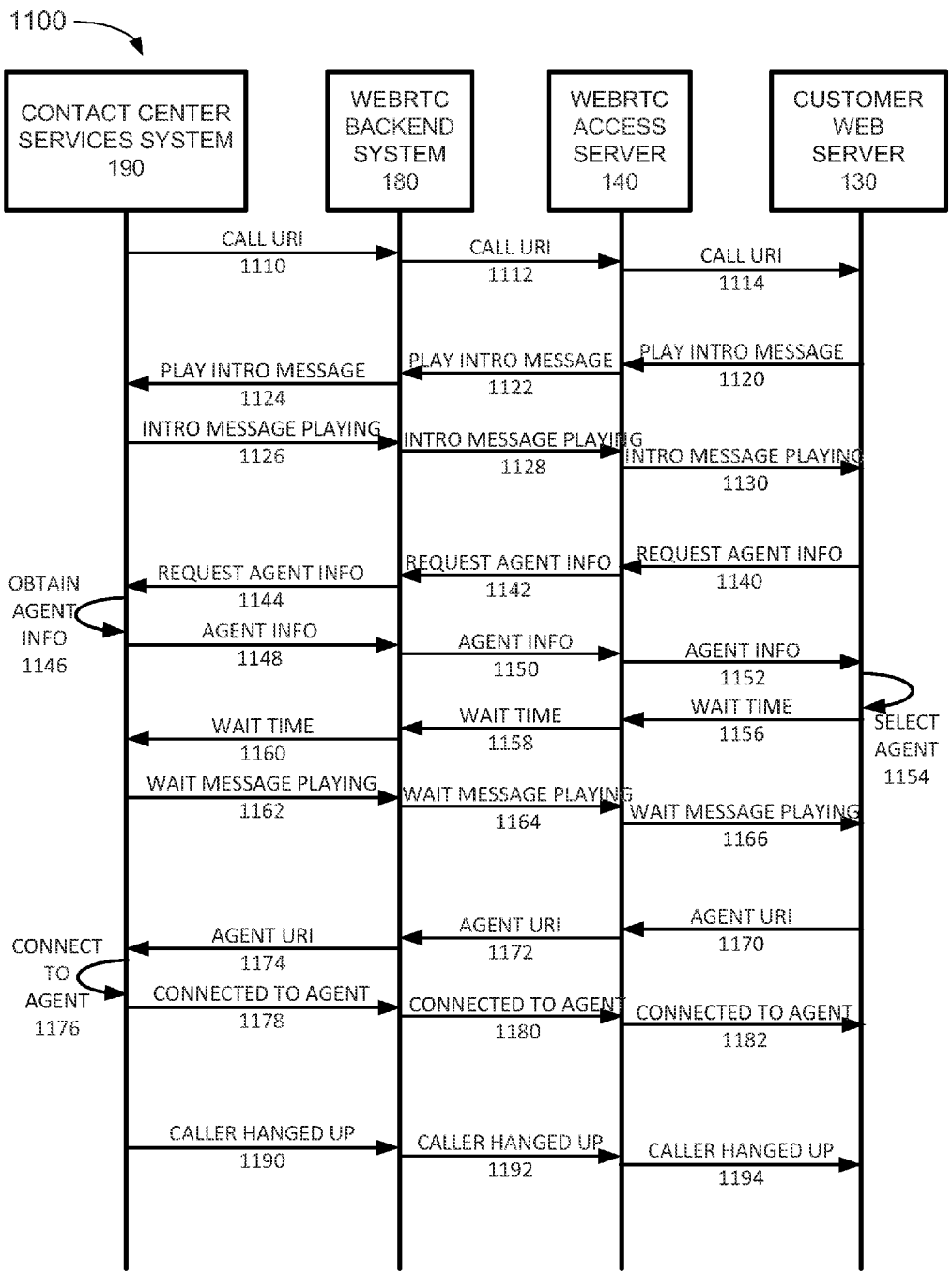
FIG. 11 is a diagram of a signal flow illustrating a sequence of call control message and report messages according to an implementation described herein.

FIG. 11 is a diagram of a signal flow 1100 illustrating a sequence of call control message and report messages according to an implementation described herein. Signal flow 1100 illustrates a sequence of control actions and/or report actions that may be exchanged by contact center services system 190 and customer web server 130, via WebRTC backend system 180, for a WebRTC call. Contact center services system 190 may assign a URI to the WebRTC call. Signal flow 1100 may include contact center services system 190 sending the URI assigned to the call to customer web server 130, via WebRTC backend system 180 and WebRTC access server 140 (signals 1110, 1112, and 1114).

Customer web server 130 may respond by sending a control action message, which may include the URI assigned to the call, to play an introductory message to the caller to contact center services system 190, via WebRTC access server 140 and WebRTC backend system 180 (signals 1120, 1122, and 1124). Contact center services system 190 may identify the call based on the URI included in the control message, may play the introductory message to the caller associated with the identified call, and may send a response message, which may include the URI assigned to the call, back to customer web server 130, via WebRTC backend system 180 and WebRTC access server 140, indicating that the introductory message is being played (signals 1126, 1128, and 1130).

Customer web server 130 may proceed to request information from the caller that may be used to select a contact center agent, such as requesting that the caller make a selection from a menu of options describing the caller's reason for the call. The request for the information, which may include the URI assigned to the call, may be sent to contact center services system 190, via WebRTC access server 140 and WebRTC backend system 180 (signals 1140, 1142, and 1144). Contact center services system 190 may identify the call based on the URI included in the request, and may obtain the requested information from the caller associated with the identified call by, for example, asking the caller to select an option by voice or by pressing a button (signal 1146). Contact center services system 190 may send a response message, which may include the URI assigned to the call, back to customer web server 130 with the obtained caller information, via WebRTC backend system 180 and WebRTC access server 140 (signals 1148, 1150, and 1152).

Customer web server 130 may use the obtained information to select a contact center agent, such as WebRTC contact center agent 195 (signal 1154) and may determine an estimated wait time for the caller to talk to the selected contact center agent. Customer web server 130 may send a control message, which may include the URI assigned to the call, back to contact center services system 190, via WebRTC access server 140 and WebRTC backend system 180, instructing contact center services system 190 to play a message informing the caller of the estimated wait time (signals 1156, 1158, and 1160). Contact center services system 190 may play the wait time message and may send a response message, which may include the URI assigned to the call, back to customer web server 130, via WebRTC backend system 180 and WebRTC access server 140, indicating that the wait time message is being played (signals 1162, 1164, and 1166).

Customer web server 130 may proceed to provide a control action message, which may include the URI assigned to the call and which may include a contact center agent URI, to contact center services system 190, via WebRTC access server 140 and WebRTC backend system 180 (signals 1170, 1172, and 1174). Contact center services system 190 may identify the call based on the assigned URI, connect to the selected contact center agent using the contact center agent URI (signal 1176), and may send a response message back to customer web server 130, via WebRTC backend system 180 and WebRTC access server 140, indicating that the call has been connected to the select contact center agent (signals 1178, 1180, and 1182).

At a later time, the caller may hang up. In response, contact center services system 190 sending a report message, which may include the URI assigned to the call, to customer web server 130, via WebRTC backend system 180 and WebRTC access server 140, indicating that the caller has hung up (signals 1190, 1192, and 1194).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6A, 6B, 7A, 7B, 8A, and 8B, the order of the blocks may be modified in other implementations. Further, non-dependent blocks may be performed in parallel. As another example, while a series of signal flows have been described with respect to FIGS. 9-11, the order of the signal flows may be modified in other implementations. Further, non-dependent signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
   providing, by the computer device, a control action application programming interface to a customer web server, wherein the control action application programming interface is used by the customer web server to translate commands into control actions for Web Real-Time Communication calls in a contact center services system in a private network;
   generating, by the computer device, a Web Real-Time Communication Uniform Resource Identifier (URI) for a Web Real-Time Communication call requested by the customer web server;
   receiving, by the computer device, an instruction to perform a control action from the customer web server via a Web Real-Time Communication access server, wherein the control action is associated with the Web Real-Time Communication call in the contact center services system, and wherein the instruction includes the generated Web Real-Time Communication URI; and
   forwarding, by the computer device, the instruction to perform the control action to the contact center services system.

2. The method of claim 1, further comprising:
   receiving, from the contact center services system, a response message to the instruction to perform the control action; and
   forwarding the response message to the customer web server via the Web Real-Time Communication access server.

3. The method of claim 1, wherein the instruction to perform the control action includes at least one of:
   an instruction to play a particular message to a caller associated with the Web Real-Time Communication call;
   an instruction to park the Web Real-Time Communication call;
   an instruction to provide an estimated wait time to the caller;
   an instruction to initiate a callback;
   an instruction to transfer the Web Real-Time Communication call to a selected contact center agent; or
   an instruction to send the Web Real-Time Communication call to a particular entry point in an interactive voice response flow.

4. The method of claim 1, further comprising:
   receiving, from the contact center services system, a report message associated with the Web Real-Time Communication call;
   forwarding the received report message to the customer web server via the Web Real-Time Communication access server;
   receiving a response message to the received report message from the customer web server via the Web Real-Time Communication access server; and
   forwarding the received response message to the contact center services system.

5. The method of claim 4, wherein the report message includes at least one of:
   an indication that the Web Real-Time Communication call has been received by the contact center services system;
   an indication that a caller associated with the Web Real-Time Communication call has hung up;
   an indication that the caller has made a particular request; or
   an indication that the Web Real-Time Communication call is at a particular point in an interactive voice response flow.

6. The method of claim 1, further comprising:
   receiving, from the contact center services system, a contact center URI associated with the Web Real-Time Communication call, wherein the contact center URI is used by the contact center services system to identify the Web Real-Time Communication call; and
   forwarding the contact center URI to the customer web server via the Web Real-Time Communication access server.

7. The method of claim 6, wherein the contact center URI corresponds to the generated Web Real-Time Communication URI.

8. A computer device comprising:
   logic configured to:
      provide a control action application programming interface to a customer web server, wherein the control action application programming interface is used by the customer web server translate commands into control actions for Web Real-Time Communication calls in a contact center services system in a private network;
      generate a Web Real-Time Communication Uniform Resource Identifier (URI) for a Web Real-Time Communication call requested by the customer web server;
      receive an instruction to perform a control action from the customer web server via a Web Real-Time Communication access server, wherein the control action is associated with the Web Real-Time Communication call in the contact center services system, and wherein the instruction includes the generated Web Real-Time Communication URI; and
      forward the instruction to perform the control action to the contact center services system.

9. The computer device of claim 8, wherein the logic is further configured to:
   receive, from the contact center services system, a response message to the instruction to perform the control action; and
   forward the response message to the customer web server via the Web Real-Time Communication access server.

10. The computer device of claim 8, wherein the instruction to perform the control action includes at least one of:
    an instruction to play a particular message to a caller associated with the Web Real-Time Communication call;
    an instruction to park the Web Real-Time Communication call;

an instruction to provide an estimated wait time to the caller;
an instruction to obtain particular information from the caller;
an instruction to initiate a callback;
an instruction to transfer the Web Real-Time Communication call to a selected contact center agent; or
an instruction to send the Web Real-Time Communication call to a particular entry point in an interactive voice response flow.

11. The computer device of claim 8, wherein the logic is further configured to:
receive, from the contact center services system, a report message associated with the Web Real-Time Communication call;
forward the received report message to the customer web server via the Web Real-Time Communication access server;
receive a response message to the received report message from the customer web server via the Web Real-Time Communication access server; and
forward the received response message to the contact center services system.

12. The computer device of claim 11, wherein the report message includes at least one of:
an indication that the Web Real-Time Communication call has been received by the contact center services system;
an indication that a caller associated with the Web Real-Time Communication call has hung up;
an indication that the caller has made a particular request; or
an indication that the Web Real-Time Communication call is at a particular point in an interactive voice response flow.

13. The computer device of claim 8, wherein the logic is further configured to:
receive, from the contact center services system, a contact center URI associated with the Web Real-Time Communication call, wherein the contact center URI is used by the contact center services system to identify the Web Real-Time Communication call; and
forward the contact center URI to the customer web server via the Web Real-Time Communication access server.

14. The computer device of claim 13, wherein the contact center URI corresponds to the generated Web Real-Time Communication URI.

15. A system comprising:
a contact center services system configured to:
receive a Web Real-Time Communication call from a Web Real-Time Communication caller device;
a Web Real-Time Communication device configured to:
provide a control action application programming interface to a customer web server, wherein the control action application programming interface is used by the customer web server to translate commands into control actions for Web Real-Time Communication calls in the contact center services system;
generate a Web Real-Time Communication Uniform Resource Identifier (URI) for the Web Real-Time Communication call requested by the customer web server;
receive an instruction to perform a control action from the customer web server via a Web Real-Time Communication access server, wherein the control action is associated with the Web Real-Time Communication call, and wherein the instruction includes the generated Web Real-Time Communication URI; and
forward the instruction to perform the control action to the contact center services system; and
wherein the contact center services system is further configured to:
retrieve the Web Real-Time Communication URI from the received instruction;
identify that the Web Real-Time Communication call is associated with the control action based on the retrieved the Web Real-Time Communication URI; and
execute the control action on the identified Web Real-Time Communication call based on the instruction.

16. The system of claim 15, wherein the contact center services system is further configured to:
generate a response message, in response to executing the control action on the identified Web Real-Time Communication call; and
forward the response message to the customer web server via the Web Real-Time Communication device.

17. The system of claim 15, wherein the instruction to perform the control action includes at least one of:
an instruction to play a particular message to a caller associated with the Web Real-Time Communication call;
an instruction to park the Web Real-Time Communication call;
an instruction to provide an estimated wait time to the caller;
an instruction to obtain particular information from the caller;
an instruction to initiate a callback;
an instruction to transfer the Web Real-Time Communication call to a selected contact center agent; or
an instruction to send the Web Real-Time Communication call to a particular entry point in an interactive voice response flow.

18. The system of claim 15, wherein the contact center services system is further configured to:
generate a report message associated with the Web Real-Time Communication call; and
forward the generated report message to the customer web server via the Web Real-Time Communication device.

19. The system of claim 18, wherein the generated report message includes at least one of:
an indication that the Web Real-Time Communication call has been received by the contact center services system;
an indication that a caller associated with the Web Real-Time Communication call has hung up;
an indication that the caller has made a particular request; or
an indication that the Web Real-Time Communication call is at a particular point in an interactive voice response flow.

* * * * *